Figure 1:
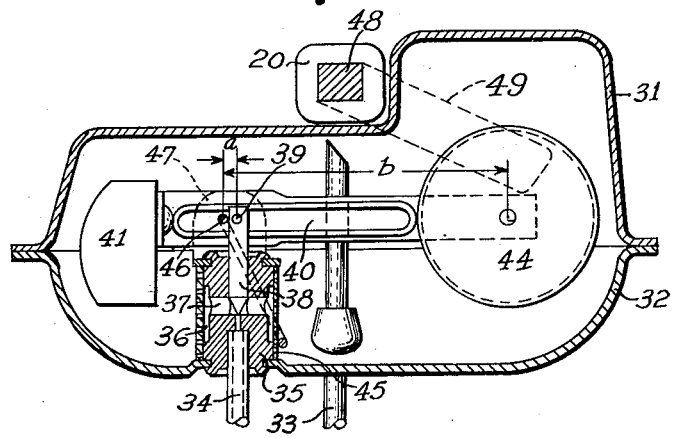

Jan. 2, 1945. R. HINTZE ET AL 2,366,404
REFRIGERATING APPARATUS OF THE COMPRESSION TYPE
Filed Sept. 21, 1940 2 Sheets-Sheet 1

Inventors:
RUDOLF HINTZE
&
ANTON ENGELMANN
BY
Attorney.

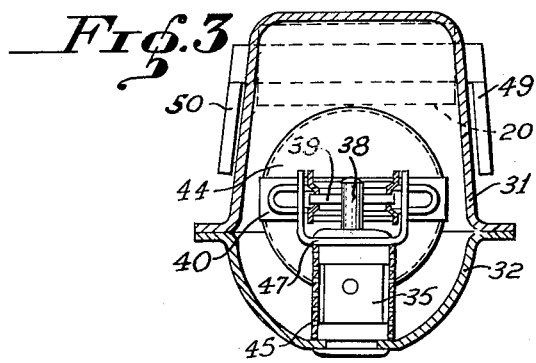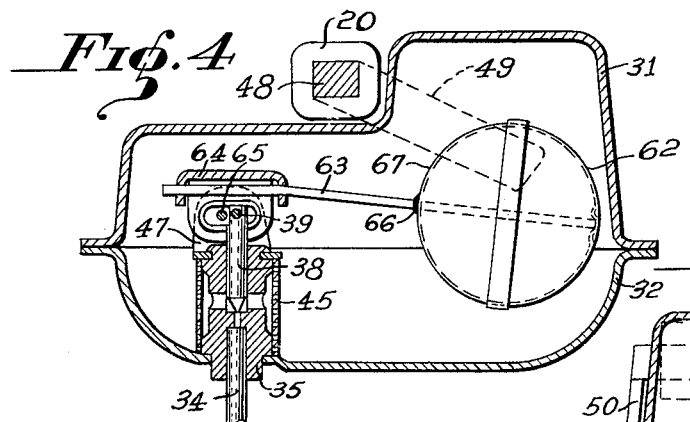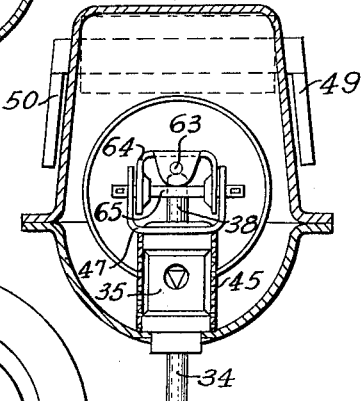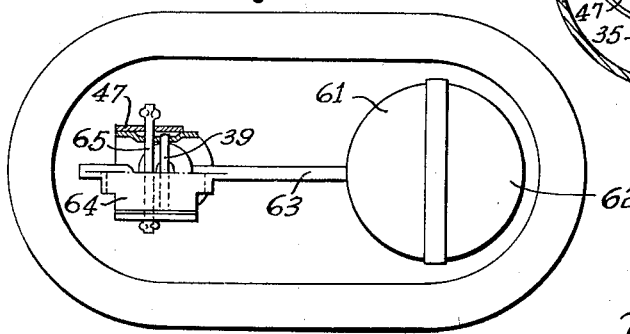

Patented Jan. 2, 1945

2,366,404

UNITED STATES PATENT OFFICE 2,366,404

REFRIGERATING APPARATUS OF THE COMPRESSION TYPE

Rudolf Hintze, Berlin-Charlottenburg, and Anton Engelmann, Berlin-Tegel, Germany; vested in the Alien Property Custodian Application September 21, 1940, Serial No. 357,688
In Germany June 3, 1939

2 Claims. (Cl. 137—68)

The present invention relates to improvements in refrigerating apparatus of the compression type.

It is well known in the art to control in such refrigerating apparatus the quantity of refrigerant, flowing from the condenser to the evaporator, by means of a float-controlled valve. Such a valve, comprising the valve proper, the float, and a lever system connecting the float with the valve, is, as a rule, arranged in a separate tank. The valve constructions hitherto known require a relatively large amount of material, since a comparatively large reserve of energy must be available in order to overcome with certainty a jamming which may occur within the float lever system. An object of the invention is to reduce considerably the amount of material required for the float valve without impairing the reliability of its operation. This is accomplished according to the invention by securing the float body to a rocking lever which is rotatably mounted in a stationary carrier and connected with the valve needle, the ratio of transmission being preferably 10 to 1 and more. By choosing such a great ratio of transmission it is possible to employ a very small float for operating the valve. Further objects and features of the float-operated valve according to the invention will be explained hereinafter in connection with the description of the embodiments shown in the drawings in which Fig. 1 represents a longitudinal, part-sectional view of a complete float valve, Fig. 2 a top view of the same float valve with the cover of the float container removed, and Fig. 3 a part-sectional front view of the same embodiment, Fig. 4 is a longitudinal part-sectional view of another embodiment, and Figs. 5 and 6 are a top view and a part-sectional front view of the second embodiment.

Figure 2:
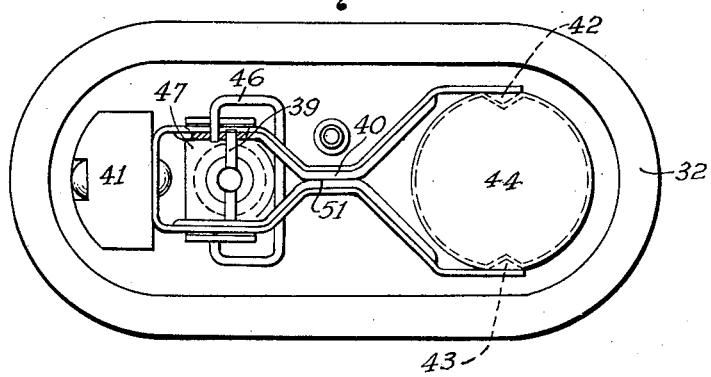

In Figs. 1 to 3, the tank containing the valve consists of two parts 31 and 32 firmly secured together around their edges by welding. From the condenser (not shown) extends a conduit 33 into the interior of the tank in order to supply it with liquid refrigerant. 34 denotes a refrigerant conduit which extends from the float tank to the evaporator (not shown), and ends in a valve body 35 containing a movable valve needle 38. The refrigerant flows from the condenser through the passages 36 and 37 of the body 35 and then through the conduit 34 to the evaporator when the valve needle is in the open position. The valve needle 38 is secured to a rocking lever 40 by means of a pin 39. The rocking lever 40 is in turn rotatably mounted in the manner shown in the drawings on a carrier 47 with the aid of a bent wire 46, the upper end of the carrier 47 being secured to the body 35. The rocking lever 40 carries at one end a counterweight 41 and at the other the ball float 44 made of two halves. The ball float is provided with two depressions 42 and 43 engaged by corresponding projections of the rocking lever 40. The ball, therefore, is not firmly secured to the rocking lever itself by welding; screws or the like. The two arms of the rocking lever 40 are welded together as indicated at 51. The upper part 51 of the float tank has an upwardly extending projection at the side facing the ball 44 in order to permit the float free movements in the upward and downward direction. On the offset wall of the upper part of the tank, an electromagnet 20 is mounted which serves to open the valve at will. The iron body 48 of this electromagnet is U-shaped and forms two limbs 49 and 50 extending exteriorly of the float tank. As soon as the exciting current, which flows through the coil 20, has exceeded a predetermined value, the ball float 44 is attracted in the upward direction, thereby removing the valve needle 38 from its seat. In Fig. 1, $a$ and $b$ indicate the effective lengths of the lever arms of rocking lever 40. Owing to the great ratio of transmission $b:a$, the dimensions of the arrangement, particularly the size of the ball float may be considerably reduced as compared with the known constructions, without reducing the forces acting upon the valve needle. 45 denotes a sieve which prevents foreign substances from passing from the tank into the valve.

The embodiment shown in Figs. 4 to 6 contains a lever mechanism of simplified design. In Figs. 4 to 6, the same reference numerals as in Figs. 1 to 3 are used for indicating similar elements. The float ball consists of two halves 61 and 62. The rocking lever 63 is designed in the form of a simple wire or rod which extends through the ball as shown in Fig. 4 and which is welded to the ball half 61 as indicated at 66. The lever 63 is firmly secured to a stirrup 64 by welding. The stirrup is rotatably mounted on the carrier 47 by means of a pin 65, and is also connected with the valve needle 38 by means of a pin 39.

We claim:

1. A float valve for controlling the flow of liquid refrigerant in refrigerators, comprising a collecting tank, conduits connected with said tank for conducting liquid refrigerant into and out of said tank, a control valve disposed in said tank and connected with one of said conduits, a float body arranged in said tank, a lever connecting said body with said valve to operate said valve in dependence upon variations of the level of said liquid refrigerant in said tank, and an electromagnet mounted on said tank for actuating said valve independently of said liquid level, said electromagnet having a magnet body provided with two lateral limbs extending at opposite sides of said float body to move said body when energized.

2. A float valve for controlling the flow of liquid refrigerant in refrigerators, comprising a collecting tank, conduits connected with said tank for conducting liquid refrigerant into and out of said tank, a control valve disposed in said tank and connected with one of said conduits, a float body arranged in said tank, a lever having a stationary fulcrum relative to said tank and being connected with said float body and said valve so as to have a ratio of transmission of at least ten to one, and an electromagnet mounted exteriorly on said tank and having a magnet body provided with two lateral limbs extending at opposite sides of said float body to move said body when energized.

RUDOLF HINTZE.
ANTON ENGELMANN.